United States Patent
Shin et al.

(10) Patent No.: US 11,570,407 B2
(45) Date of Patent: Jan. 31, 2023

(54) ELECTRONIC DEVICE AND ANTENNA STRUCTURE THEREOF

(71) Applicant: SAMSUNG ELECTRONICS CO., LTD., Suwon-si (KR)

(72) Inventors: Yongjoo Shin, Suwon-si (KR); Sohyeon Kim, Suwon-si (KR); Inyoung Lee, Suwon-si (KR); Yuri Sin, Suwon-si (KR); Jiwoo Lee, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 16/697,738

(22) Filed: Nov. 27, 2019

(65) Prior Publication Data

US 2020/0260051 A1    Aug. 13, 2020

(30) Foreign Application Priority Data

Nov. 28, 2018 (KR) .................. 10-2018-0149756

(51) Int. Cl.
*H01Q 21/06* (2006.01)
*H04N 7/18* (2006.01)
*H04N 5/225* (2006.01)

(52) U.S. Cl.
CPC .......... *H04N 7/181* (2013.01); *H01Q 21/064* (2013.01); *H04N 5/2252* (2013.01); *H01Q 21/065* (2013.01); *H04N 5/2253* (2013.01)

(58) Field of Classification Search
CPC ............. H01Q 21/0043; H01Q 21/005; H01Q 21/0062; H01Q 21/06; H01Q 21/064; H01Q 21/20; H01Q 13/10; H01Q 13/18
See application file for complete search history.

(56) References Cited

U.S. PATENT DOCUMENTS 2,929,064 A * 3/1960 Kelly ..................... H01Q 13/18
  439/112
3,022,506 A * 2/1962 Goebels, Jr. ........ H01Q 21/0012
  343/766

(Continued)

FOREIGN PATENT DOCUMENTS

KR    10-2014-0107145    9/2014
KR    10-2018-0108149    10/2018

OTHER PUBLICATIONS

Yang et al., "Synthesis of a Travelling Wave Slotted Substrate Integrated Waveguide (SIW) Array with Dual-Circular Polarization", IEEE, 2013, 3 pages.

(Continued)

*Primary Examiner* — Jason Crawford
(74) *Attorney, Agent, or Firm* — Nixon & Vanderhye P.C.

(57) ABSTRACT

Various embodiments relate to an electronic device that supports millimeter wave communication. The electronic device may include: a housing; an antenna structure including at least one antenna comprising a portion of the housing or positioned in the housing, and including an annular conductive structure comprising a conductive material, the annular conductive structure having a first surface facing an outside of the housing, a second surface facing a direction opposite the first surface, an internal space defined by the first surface and the second surface, and a plurality of slots having a repeating pattern and formed through the first surface to the internal space; a conductive member comprising a conductive material disposed in the internal space; a wireless communication circuit electrically connected with the conductive member and configured to form a directional beam using the antenna structure; and a ground electrically connected to the annular conductive structure.

19 Claims, 17 Drawing Sheets

(56) References Cited

U.S. PATENT DOCUMENTS

| | | | | |
|---|---|---|---|---|
| 3,063,049 | A | * | 11/1962 | Kelly .................. H01Q 25/02 343/771 |
| 4,536,767 | A | * | 8/1985 | Rembold ........... H01Q 21/0012 343/753 |
| 4,994,817 | A | * | 2/1991 | Munson .................. H01Q 5/40 343/769 |
| 5,175,561 | A | * | 12/1992 | Goto ..................... H01Q 13/18 343/769 |
| 5,187,490 | A | * | 2/1993 | Ohta .................... H01Q 21/064 343/770 |
| 5,194,876 | A | * | 3/1993 | Schnetzer ............. H01Q 13/18 343/769 |
| 5,239,311 | A | * | 8/1993 | Arimura ........... H01Q 21/0012 343/770 |
| 5,394,163 | A | * | 2/1995 | Bullen .................. F41G 7/2246 343/700 R |
| 6,388,632 | B1 | * | 5/2002 | Murakawa ........... H01Q 21/064 118/723 MW |
| 7,233,297 | B1 | * | 6/2007 | Harvey ................. H01Q 13/10 343/768 |
| 9,515,372 | B2 | | 12/2016 | Chang et al. |
| 10,193,216 | B2 | | 1/2019 | Dabov |
| 10,454,184 | B2 | | 10/2019 | Boutayeb et al. |
| 2001/0054605 | A1 | * | 12/2001 | Suzuki .................. H01J 37/304 219/121.41 |
| 2004/0021611 | A1 | * | 2/2004 | Iida .................... H01Q 21/0087 343/770 |
| 2011/0057562 | A1 | * | 3/2011 | Chen .................... H01J 37/3222 315/39 |
| 2012/0162039 | A1 | * | 6/2012 | Amano .................. H01Q 21/22 343/767 |
| 2014/0159958 | A1 | | 6/2014 | Haziza |
| 2015/0349410 | A1 | | 12/2015 | Russell et al. |
| 2016/0308272 | A1 | | 10/2016 | Standke et al. |
| 2017/0214422 | A1 | | 7/2017 | Na et al. |
| 2017/0237908 | A1 | | 8/2017 | Ko et al. |
| 2018/0076529 | A1 | | 3/2018 | Minard et al. |
| 2018/0219299 | A1 | * | 8/2018 | Boutayeb ........... H01Q 21/0056 |
| 2020/0260051 | A1 | * | 8/2020 | Shin ........................ H01Q 1/24 |

OTHER PUBLICATIONS

International Search Report and Written Opinion dated Mar. 20, 2020 in counterpart International Patent Application No. PCT/KR2019/016514.

* cited by examiner

| Tilting angle of slots [Number of slots: 10 pieces] | 30 Degrees | 45 Degrees | 60 Degrees |
|---|---|---|---|
| Slot antenna |  |  |  |
| Gain [dB] | 9.6 | 10.9 | 9.5 |

| Number of slots [Tilting angle: 45 degrees] | 8 Pieces | 10 Pieces | 12 Pieces |
|---|---|---|---|
| Slot antenna |  |  |  |
| Gain [dB] | 8.5 | 10.9 | 9.2 |

ELECTRONIC DEVICE AND ANTENNA STRUCTURE THEREOF

CROSS-REFERENCE TO RELATED APPLICATION

This application is based on and claims priority under 35 U.S.C. § 119 to Korean Patent Application No. 10-2018-0149756, filed on Nov. 28, 2018, in the Korean Intellectual Property Office, the disclosure of which is incorporated by reference herein in its entirety.

BACKGROUND

1) Field

The disclosure relates to an electronic device and an antenna structure thereof.

2) Description of Related Art

Electronic devices with various functions have been introduced with development in electronic communication technology. These electronic devices can complexly perform one or more functions. For example, electronic devices may include at least one camera (or image sensor) that can take still images or moving images.

Recent electronic devices can take still images or moving images with high quality (e.g., Ultra High Definition). Further, recent electronic devices can take pictures 360 degrees through several cameras.

Recent electronic devices are required to support high-speed communication (e.g., millimeter wave communication) that can transmit high-quality images to external device in real time.

The above information is presented as background information only to assist with an understanding of the disclosure. No determination has been made, and no assertion is made, as to whether any of the above might be applicable as prior art with regard to the disclosure.

SUMMARY

According to various embodiments, it is possible to provide an electronic device with an antenna for high-speed communication that can transmit large-size data in real or substantially real time.

According to various embodiments, it is possible to provide an electronic device that uses a conductive element or portion (e.g., in the form of a decoration), on the outer side of an electronic device, as an antenna for high-speed communication.

According to various embodiments, it is possible to provide an electronic device that can transmit/receive radio signals at a high speed in substantially all directions by combining several directional antennas.

According to an embodiment, an electronic device may include: a housing; an antenna structure including a portion of the housing or disposed in the housing, and including an annular conductive structure, the annular conductive structure including a first surface facing an outside of the housing, a second surface facing a direction opposite the first surface, an internal space defined by the first surface and the second surface, and a plurality of slots having a repeating pattern and formed through the first surface to the internal space; a conductive member disposed in the internal space; a wireless communication circuit electrically connected with the conductive member and configured to provide a directional beam using the antenna; and a ground electrically connected to the annular conductive portion.

According to an embodiment, an electronic device may include: a housing; a first camera disposed in a first opening of the housing and configured to photograph in a first direction; a second camera disposed in a second opening of the housing and configured to photograph in a second direction opposite the first direction; a first antenna including a first conductive structure surrounding the first camera, and configured to provide a directional beam in the first direction; a second antenna including a second conductive structure surrounding the second camera, and configured to provide a directional beam in the second direction; and at least one third antenna configured to provide a directional beam in a third direction perpendicular to the first direction and the second direction, wherein the first conductive structure and the second conductive structure may include: a first surface facing an outside of the housing; a second surface facing a direction opposite the first surface; an internal space defined by the first surface and the second surface; and a plurality of slots having a repeating pattern disposed on the first surface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
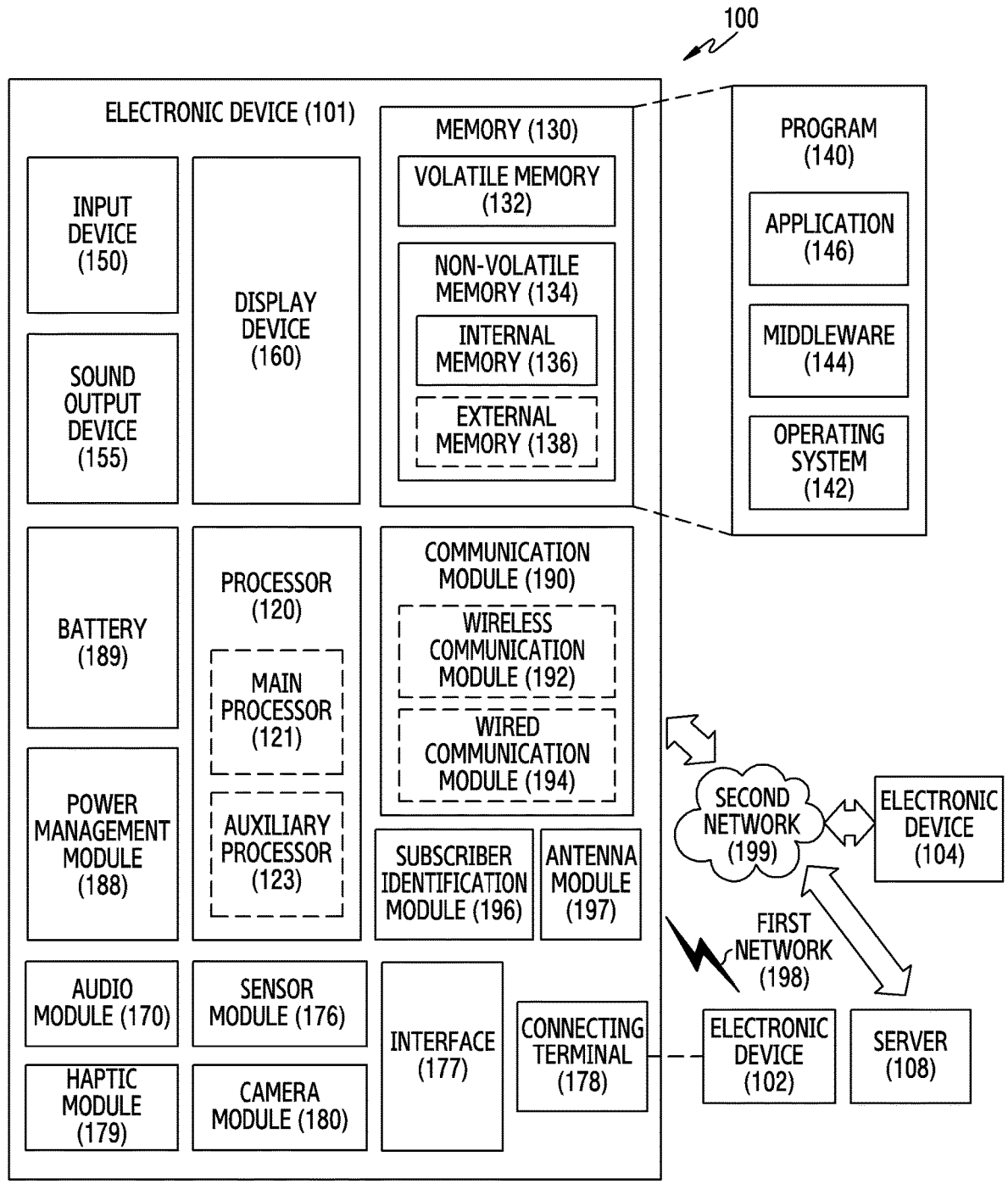
FIG. 1 is a block diagram illustrating an example electronic device in a network environment according to an embodiment.

Hereinafter, various example embodiments will be described in greater detail with reference to the accompanying drawings. In the disclosure, specific embodiments are illustrated in the drawings and a detailed description is provided, but the disclosure is not intended to limit various example embodiments. For example, it will be apparent to those skilled in the art that embodiments may be changed in various ways.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
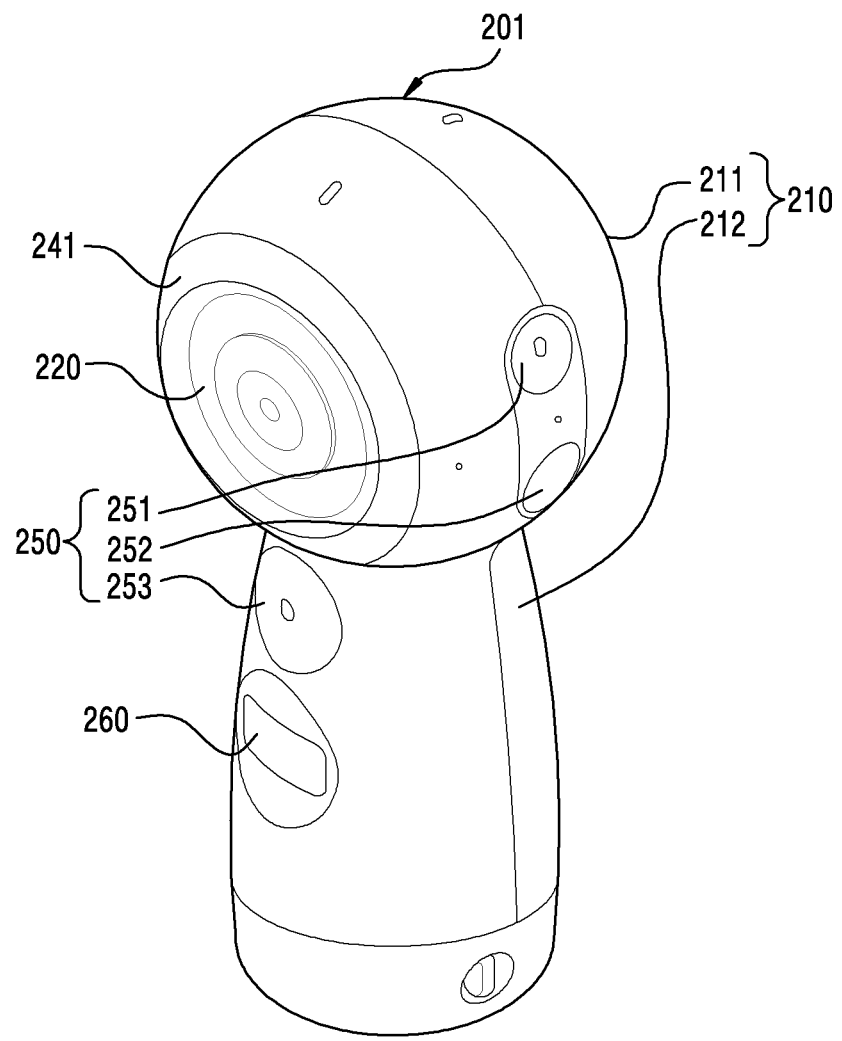
FIG. 2A is a perspective view illustrating an external appearance of an example electronic device according to an embodiment.
Figure 2B:
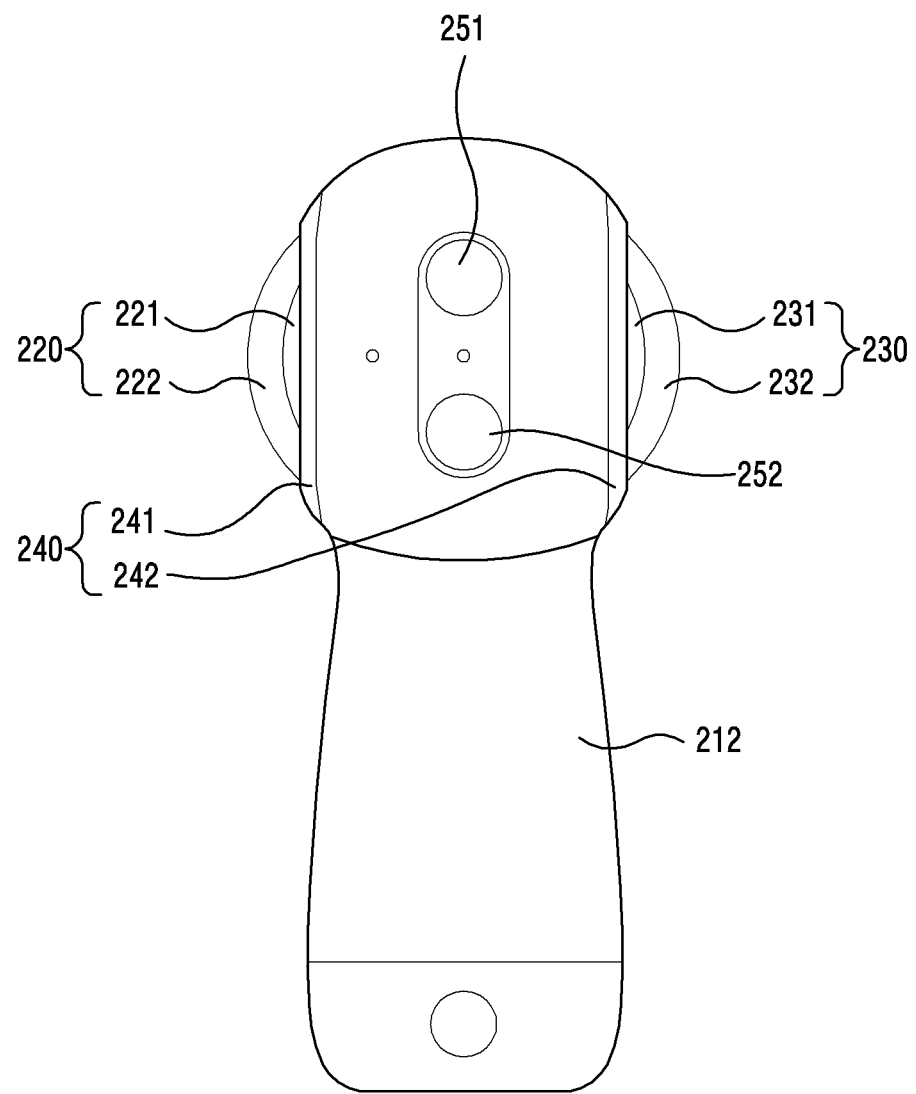
FIG. 2B is a side perspective view illustrating a side of an example electronic device according to an embodiment.
Figure 3:
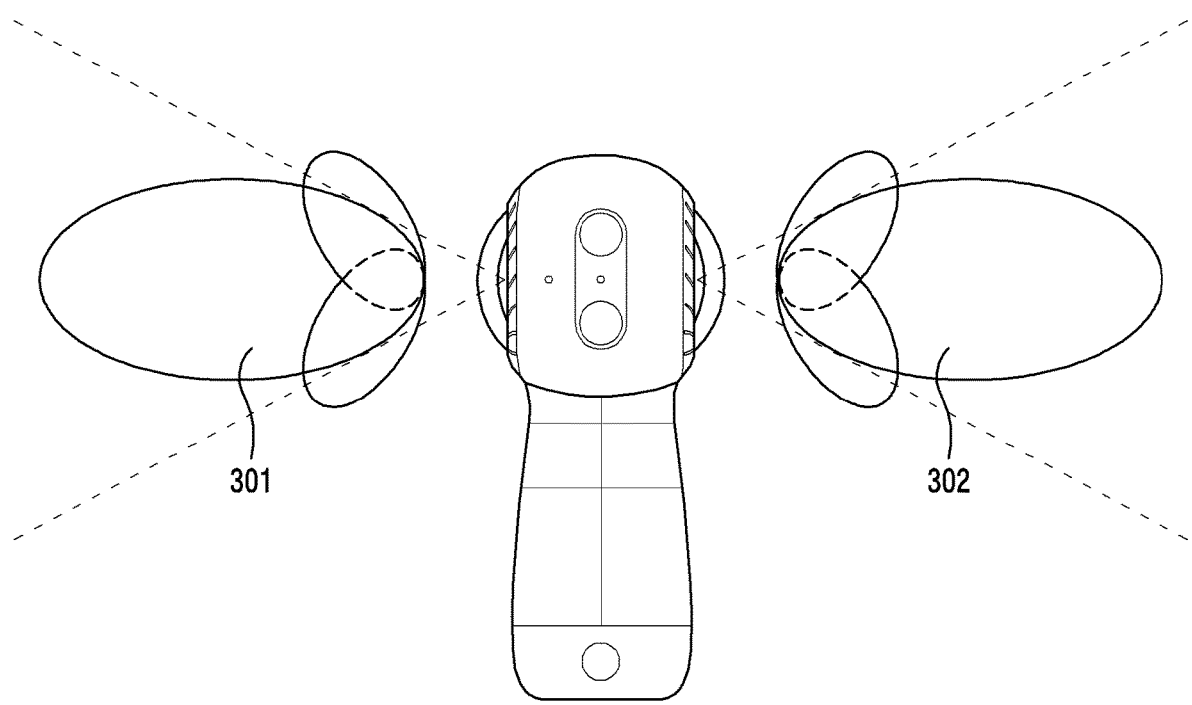
FIG. 3 is a diagram illustrating an example radiation pattern of an electronic device according to an embodiment.

FIG. 2A is a perspective view illustrating an external appearance of an example electronic device according to an embodiment, FIG. 2B is a perspective view illustrating a side of an example electronic device according to an embodiment, and FIG. 3 is a diagram illustrating an example radiation pattern of an electronic device according to an embodiment.

Referring to FIGS. 2A, 2B, and 3, an electronic device 201 according to an embodiment (e.g., an electronic device 101) may include a housing 210, a first camera 220, a second camera 230, an antenna module (e.g., including an antenna) 240, an input device (e.g., including input circuitry) 250, and/or a display 260.

The electronic device 210 may, for example, be a Virtual Reality (VR) imaging device that can take 3D images (e.g., 360-degree images) using a first camera 220 that takes images in a first direction (e.g., front direction) and a second camera 230 that takes images in a second direction (e.g., rear direction) opposite to the first direction.

The housing 210 according to an embodiment may, for example, include a case of the electronic device 201 and may be made of a nonconductive material (e.g., an injected mold). The housing 210 may have the first camera 220 and the second camera 230 therein, and may include a first body 211 having a complete or substantially spherical shape and a second body 212 having a substantially cylindrical shape elongated in one direction. Various electronic parts (e.g., a microphone, a speaker, or a printed circuit board) may be disposed in the housing 210.

The first camera 220 and the second camera 230 that are disposed opposite each other may be disposed in the first body 211 of the housing 210 according to an embodiment. For example, the first body 211 may have openings for mounting the first camera 220 and the second camera 230.

The first body 211 may include lens covers 222 and 232 that protect lenses 221 and 231 of the first camera 220 and the second camera 230. For example, the housing 210 may include a first lens cover 222 disposed at a first portion and a second lens cover 232 symmetrically disposed at a second portion opposite to the first portion. The first lens cover 222 and the second lens cover 232 may protrude from the outer surface of the first body 211. The first lens cover 222 and the second lens cover 232 may be made of a transparent material (e.g., reinforced glass or a transparent injected mold).

At least one input device 250 including various input circuitry may be disposed on a side of the first body 211. For example, as shown in FIGS. 2A and 2B, the input circuitry may include, for example, and without limitation, a menu button 251 and a power/cancel button 252, or the like, that may be disposed between the first camera 220 and the second camera 230.

At least one input device 250 (e.g., an OK button 253) and a display 260 may be disposed on the second body 212. The display 260 can output various items of information (e.g., a battery state and a communication connection state) related to the operation of the electronic device 201. Meanwhile, though not shown, a charge interface and/or a memory card slot may be formed at the second body 212.

The first camera 220 and the second camera 230 may, for example, take images (e.g., still images or moving images). For example, first camera 220 and the second camera 230 may, for example, acquire 3D images (e.g., 360-degree images) with high qualities (e.g., 2k UHD or 4k MD).

The antenna module 240 may include at least one antenna and can transmit and receive radio signals. For example, the antenna module 240 can transmit and receive radio signals of a first band (e.g., millimeter waves). The first band may include, for example, frequencies between about 3 GHz and 100 GHz. The antenna module 240 can transmit in real or substantially real time the high-quality images taken through the first camera 220 and the second camera 230 to external devices.

The antenna module 240 may include a portion (part) of the housing 210 (or may be formed as a portion of the housing 210), may be disposed on the housing 210 or may be disposed in (or inside) the housing 210. The antenna module 240 may include a first antenna structure (e.g., including an antenna) 241 positioned between the first lens cover 222 and the first body 211 and a second antenna structure (e.g., including an antenna) 242 positioned, for example, between the second lens cover 232 and the first body 211. The first antenna structure 241 and the second antenna structure 242 may include an annular conductive structure comprising a conductive material. The annular conductive structure will be described in greater detail below with reference to FIGS. 4, 5, 6A, 6B, 6C, 6D, 7A and 7B.

The first antenna structure 241 and the second antenna structure 242 may be directional antennas having an radiation pattern of a predetermined direction. For example, as shown in FIG. 3, the first antenna structure 241 may have a first radiation pattern 301 that is directionally emitted in the first direction (e.g., the front direction) and the second antenna structure 242 may have a second radiation pattern 302 that is directionally emitted in the second direction (e.g., the rear direction) opposite to the first direction. The first direction may be the photographing direction of the first camera 220 and the second direction may be the photographing direction of the second camera 230.

According to an embodiment, the antenna module 240 can further transmit and receive radio signals of a second band that is different from the first band. The second band may be a frequency band (e.g., 2.4 GHz or 5 GHz) that supports near field communication (e.g., WiFi or Bluetooth communication). For example, the antenna module 240 is coupled to an antenna (e.g., a Laser Direct Structuring (LDS) antenna), which is separately provided for communication of the second band, thereby being able to operate as an antenna that transmits and receives radio signals of the second band.

Figure 4:
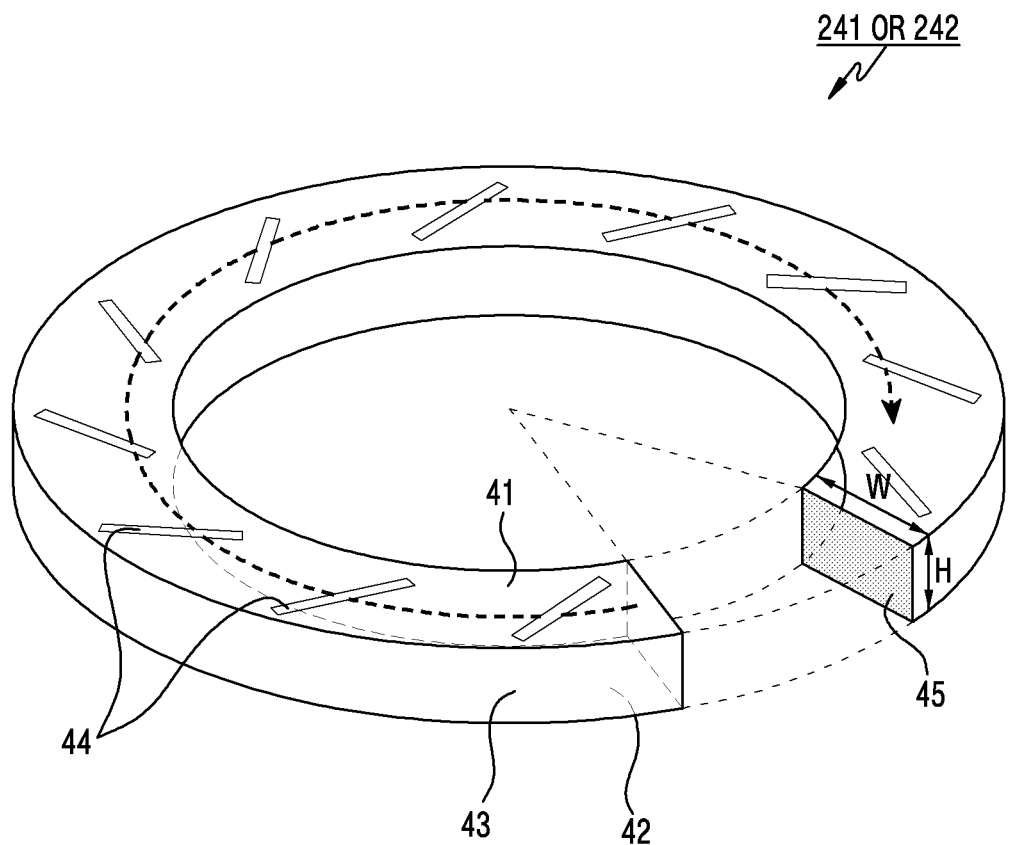
FIG. 4 is a diagram illustrating an example antenna structure of an example antenna according to an embodiment.
Figure 5:
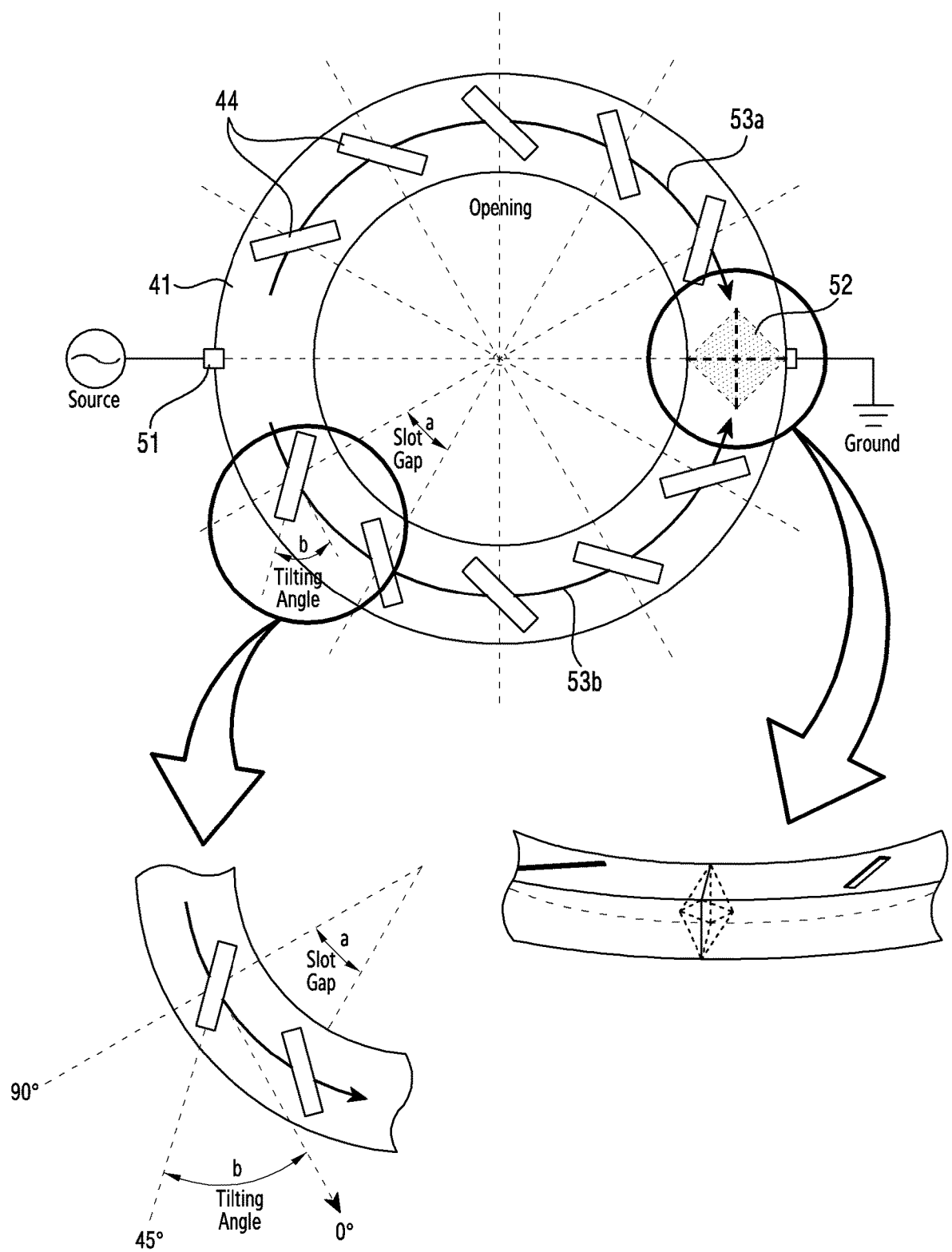
FIG. 5 is a diagram illustrating an example antenna structure of an example antenna according to an embodiment.
Figure 6A:
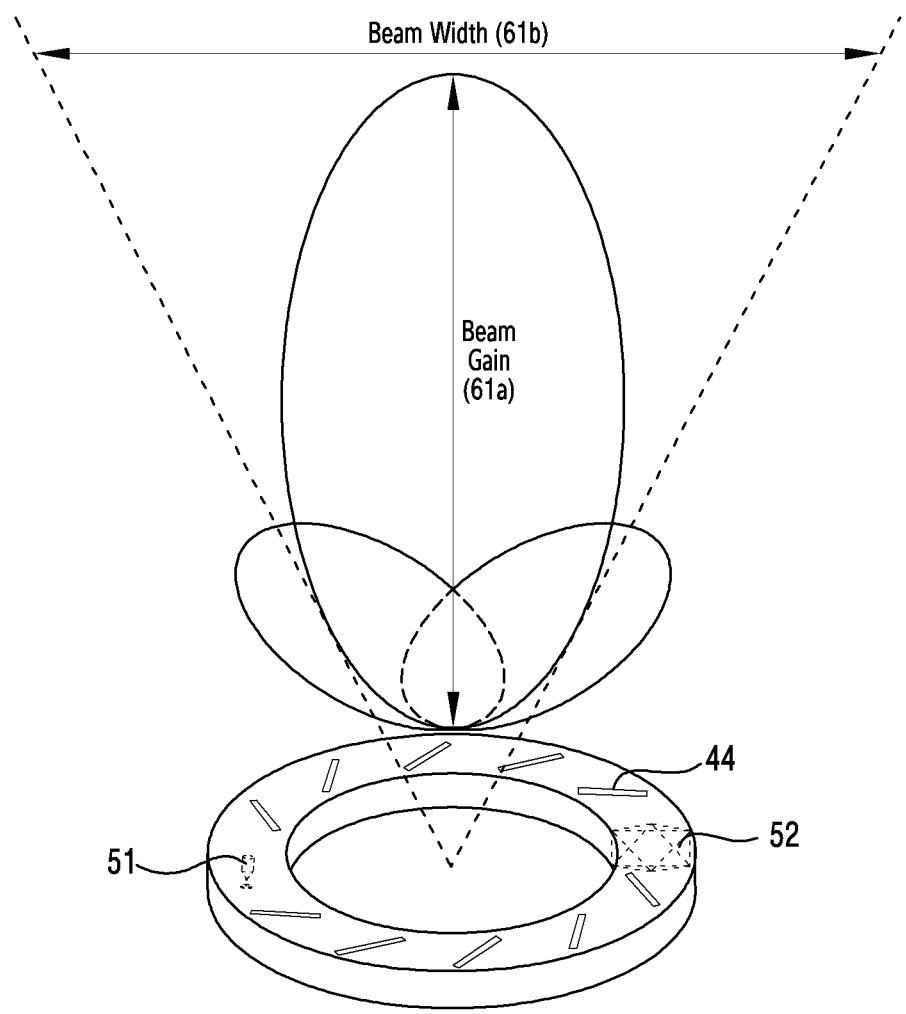
FIG. 6A is a diagram illustrating an example radiation pattern of an antenna structure according to an embodiment.
Figure 6B:
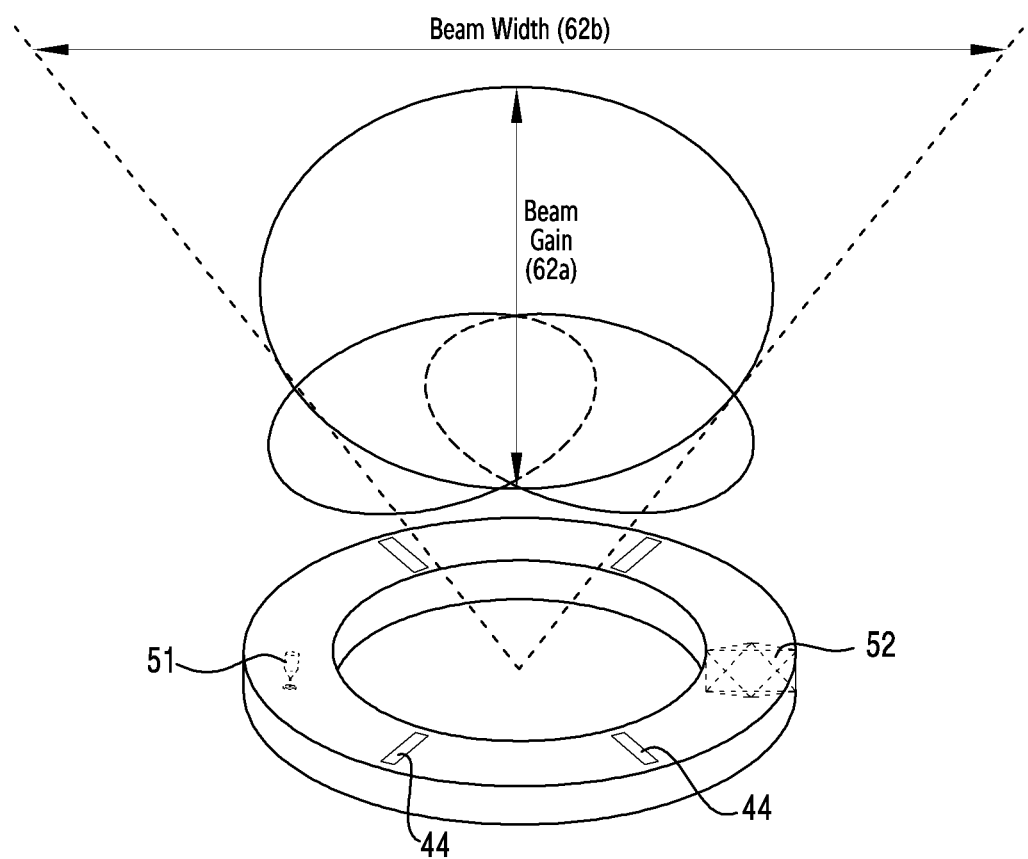
FIG. 6B is a diagram illustrating an example radiation pattern of an antenna structure according to an embodiment.
Figure 6C:
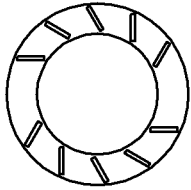
FIG. 6C is a diagram illustrating an example radiation pattern and a gain change of an antenna structure according to a tilting angle according to an embodiment.
Figure 6C:
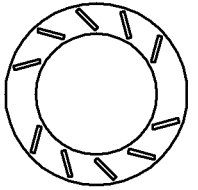
Figure 6C:
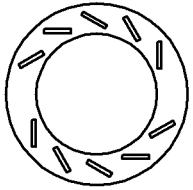
Figure 6D:
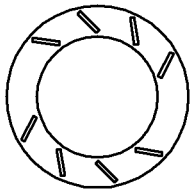
FIG. 6D is a diagram illustrating an example radiation pattern and a gain change of an antenna structure according to the number of slots according to an embodiment.
Figure 6D:
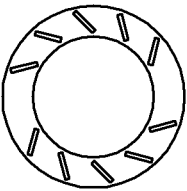
Figure 6D:
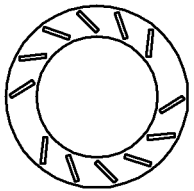

FIG. 4 is a diagram illustrating an example antenna structure according to an embodiment, FIG. 5 is a diagram illustrating an example antenna structure according to an embodiment, FIG. 6A is a diagram illustrating an example radiation pattern of an antenna structure according to an embodiment, FIG. 6B is a diagram illustrating an example radiation pattern of an antenna structure according to an embodiment, FIG. 6C is a diagram illustrating an example radiation pattern and a gain change of an antenna structure according to a tilting angle according to an embodiment, and FIG. 6D is a diagram illustrating an example radiation pattern and a gain change of an antenna structure according to the number of slots according to an embodiment.

Referring to FIGS. 4, 5, 6A, 6B, 6C and 6D, the antenna structures 241 and 242 according to an embodiment may, for example, have a circular conductive structure (e.g., including a conductive material). The conductive structure may, for example, be a rectangular waveguide structure. For example, the conductive structure may have a first surface 41 facing the outside of a housing (e.g., the housing 210), a second surface 42 facing a direction opposite the first surface 41, an internal space 43 defined by the first surface 41 and the second surface 42, and a plurality of slots 44.

The range of the resonant frequencies of the antenna structures 241 and 242 may be determined based, for example, on a cut-off frequency that depends on the width W and the height H of a cross-section 45 of the conductive structure. For example, the cut-off frequency ($f_c$) may be determined by Formula 1 below. In Formula 1 below, C denotes the speed of light.

$$f_c = \frac{C}{2 \times W} \qquad \text{<Formula 1>}$$

For example, when the width is 7.112 mm, the cut-off frequency may be 21.2 GHz.

The range of the resonant frequency may be determined between 1.25 to 1.89 times the cut-off frequency as illustrated, for example, in Formula 2 below. For example, when the cut-off frequency ($f_c$) is 21.1 GHz, the range of the resonant frequencies ($f_r$) of the antenna structures 241 and 242 may be about 26.3(=21.1*1.25) GHz to 39.8 (=21.1*1.89) GHz.

$$f_{low} = 1.25 f_c < f_r < f_{high} = 1.89 f_c \qquad \text{<Formula 2>}$$

The slots 44 may be formed with regular intervals on the first surface 41. For example, the slots 44, as shown in FIG. 5, may be formed at respective slot gaps "a" (e.g., 30 degrees) around the central axes of the antenna structures 241 and 242 and may have a symmetric structure. The slot gaps "a" may depend on the number of the slots. For example, as shown in FIG. 5, when the number of slots is 10, the slot gaps may be 30 degrees (=360/(10+2(feed member 51, offset member 52))).

The slots 44 may have a tilting angle "b". For example, each of the slots 44 may have a tilting angle between a tangential direction (0 degrees) and the central axis direction (90 degrees) of the circular conductive structure, as shown in FIG. 5.

The radiation patterns (e.g., gains, widths, and/or directions) of the antenna structure 241 and 242 may be changed in accordance with the number and tilting angle of the slots 44. For example, when ten slots 44 are formed with a tilting angle of 45 degrees, the antenna structure 241 and 242, as shown in FIG. 6A, may have a first gain 61a and a first width 61b. When four slots 44 are formed with a tilting angle of 90 degrees, the antenna structure 241 and 242, as shown in FIG. 6B, may have a second gain 62a and a second width 62b.

Even if the antenna structure 241 and 242 have the same numbers of slots, their radiation patterns and gains may be changed in accordance with the tilting angle. For example, as shown in FIG. 6C, the antenna structure 241 and 242 may have a gain of 9.6 dB when ten slots are formed with a tilting angle of 30 degrees, may have a gain of 10.9 dB when ten slots are formed with a tilting angle of 45 degrees, and may have a gain of 9.5 dB when ten slots are formed with a tilting angle of 60 degrees.

Even if the antenna structure 241 and 242 have the same tilting angles, their radiation patterns and gains may be changed in accordance with the number of slots. For example, the antenna structure 241 and 242, as shown in FIG. 6D, may have a gain of 8.5 dB when they have eight slots having a tilting angle of 45 degrees, may have a gain of 10.9 dB when they have ten slots having a tilting angle of 45 degrees, and may have a gain of 9.2 dB when they have twelve slots having a tilting angle of 45 degrees.

The antenna structure 241 and 242 may be disposed in the internal space 43 and may have a feed member 51 (or a conductive member) that feeds radio signals and an offset member 52 connected with a ground member. The feed member 51 and the offset member 52 may be disposed to face each other. Signals fed through the feed member 51 can move toward the offset member 52 through a conductive structure. For example, fed signals, as shown in FIG. 5, can move clockwise (hereafter, a first signal 53a) and counter-clockwise (hereafter, a second signal 53b).

The offset member 52 can offset the first signal 53a and the second signal 53b. The offset member 52 may be disposed to block a portion of the internal space 43 of the conductive structure, thereby being able to prevent and/or reduce collision of the first signal 53a and the second signal 53b. The offset member 52 may have a shape formed by combining two quadrangular pyramids not to reflect the first signal 53a and the second signal 53b.

A slot may not be formed in the region where the feed member 51 and the offset member 52 are disposed. This is because when slots are formed around the feed member 51, the flow of fed signals may be interfered with by the slots, when slots are formed around the offset member 52, reflective waves of the first signal 53a and the second signal 53b may be generated by the slots.

According to an embodiment, it is possible to fill the slots 44 formed on the first surfaces 41 of the antenna structures 241 and 242 with a nonconductive material (e.g., an injected mold) and coat the first surfaces 41 with the same color. This is for the aesthetic appearance of the electronic device.

Figure 7A:
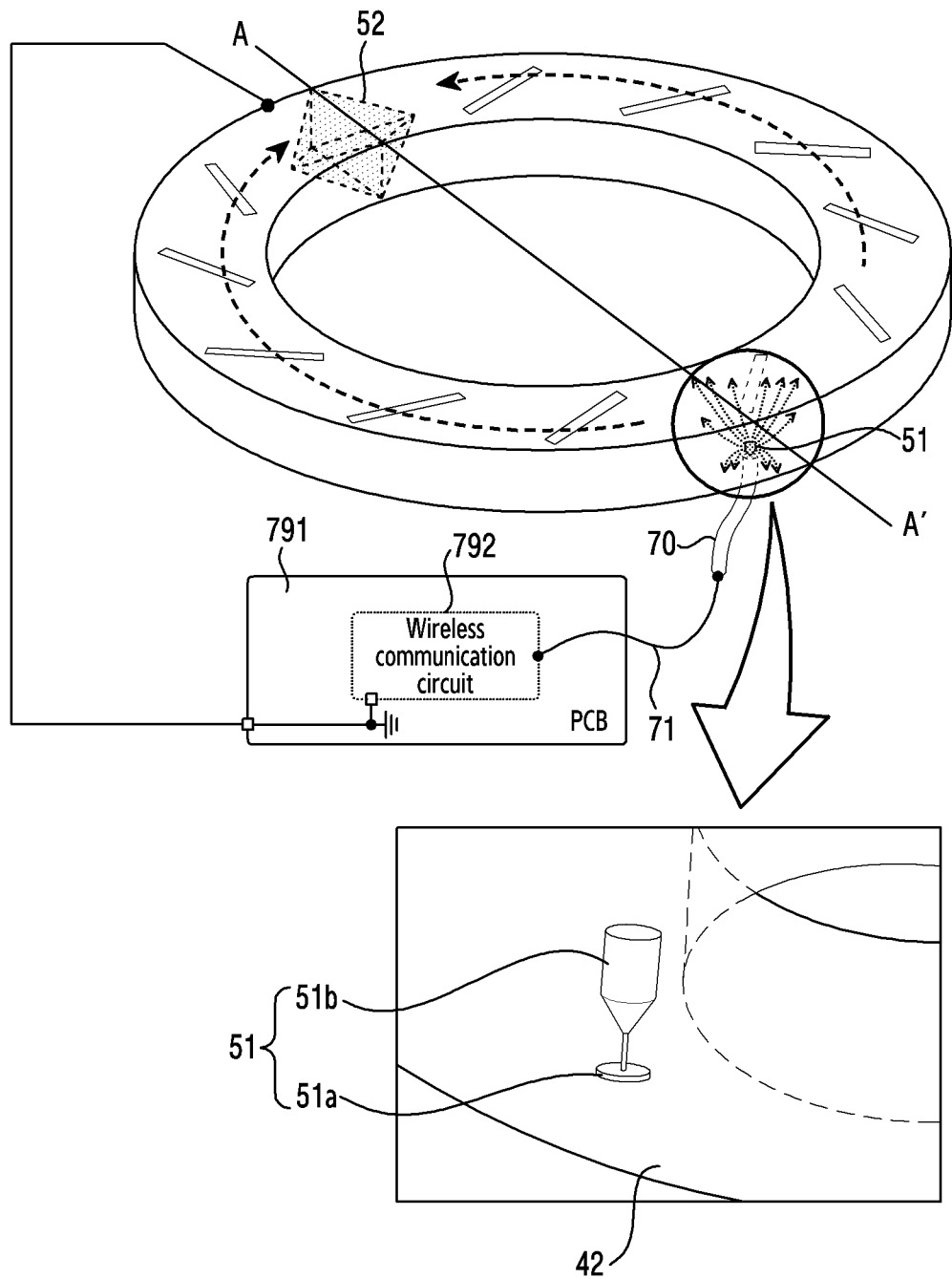
FIG. 7A is a diagram illustrating an example power supply type of an antenna structure according to an embodiment.
Figure 7B:
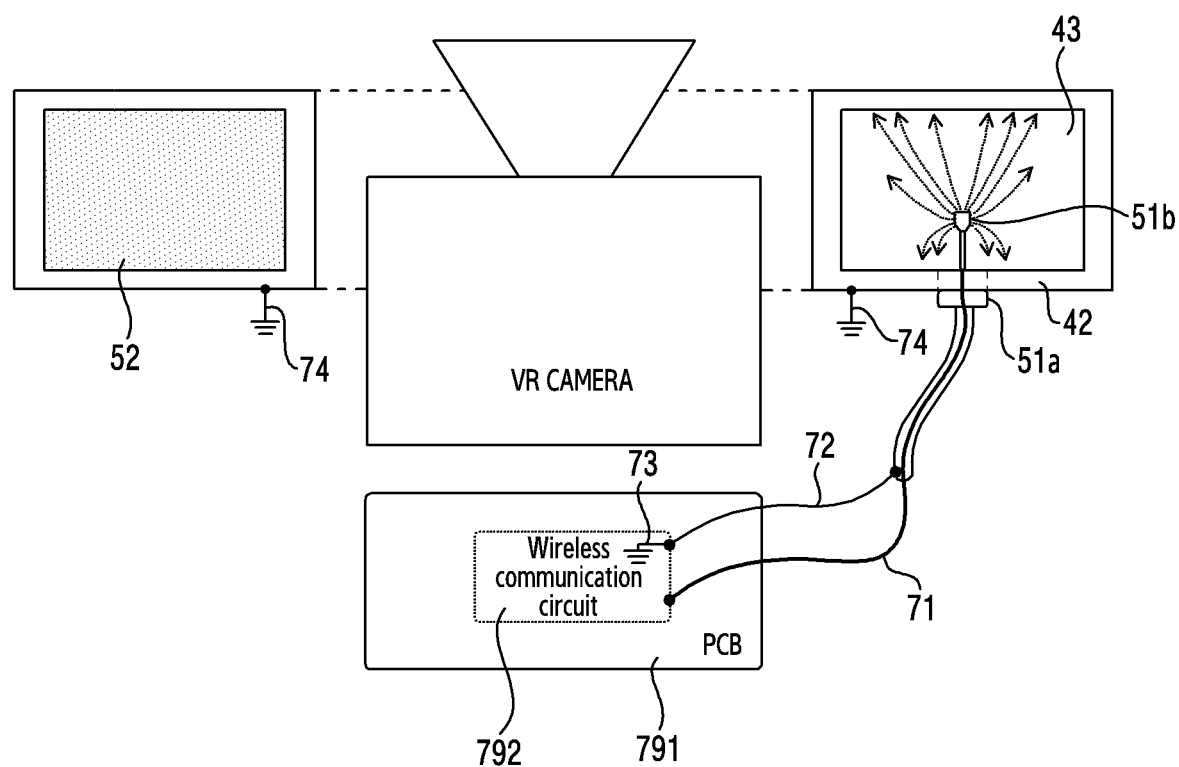
FIG. 7B is a cross-sectional view illustrating an example antenna structure according to an embodiment.

FIG. 7A is a diagram illustrating an example power supply type of an antenna structure according to an embodiment and FIG. 7B is a cross-sectional view illustrating an example antenna structure according to an embodiment.

Referring to FIGS. 7A and 7B, the feed member 51 of the antenna structures 241 and 242 according to an embodiment can be connected with a wireless communication circuit 792 through, for example, a coaxial cable 70.

The feed member 51 may have a port 51a to which the coaxial cable 70 is fastened and a probe 51b. The port 51a may be positioned on the second surface 42 of the antenna structures 241 and 242. The port 51a can be connected with the ground regions 73 (or ground members) of the wireless communication circuit 792 and a printed circuit board 791 through a ground line 72 (e.g., an external conductor) of the coaxial cable 70. The antenna structures 241 and 242 may be connected with at least one other ground region 74 (or ground member) (e.g., the ground of an electronic device) through a path other than the coaxial cable 70.

The probe 51b may be positioned in the internal space 43 of the antenna structures 241 and 242 and can emit signals, which are fed through a signal line 71 (e.g., an internal conductor) of the coaxial cable 70 from the wireless communication circuit 792, to the internal space 43. Signals emitted from the probes 51b can generate a coupling effect with the antenna structures 241 and 242 and can move (e.g., wave flow can be generated) to the offset member 52 along the internal space 43.

Figure 8A:
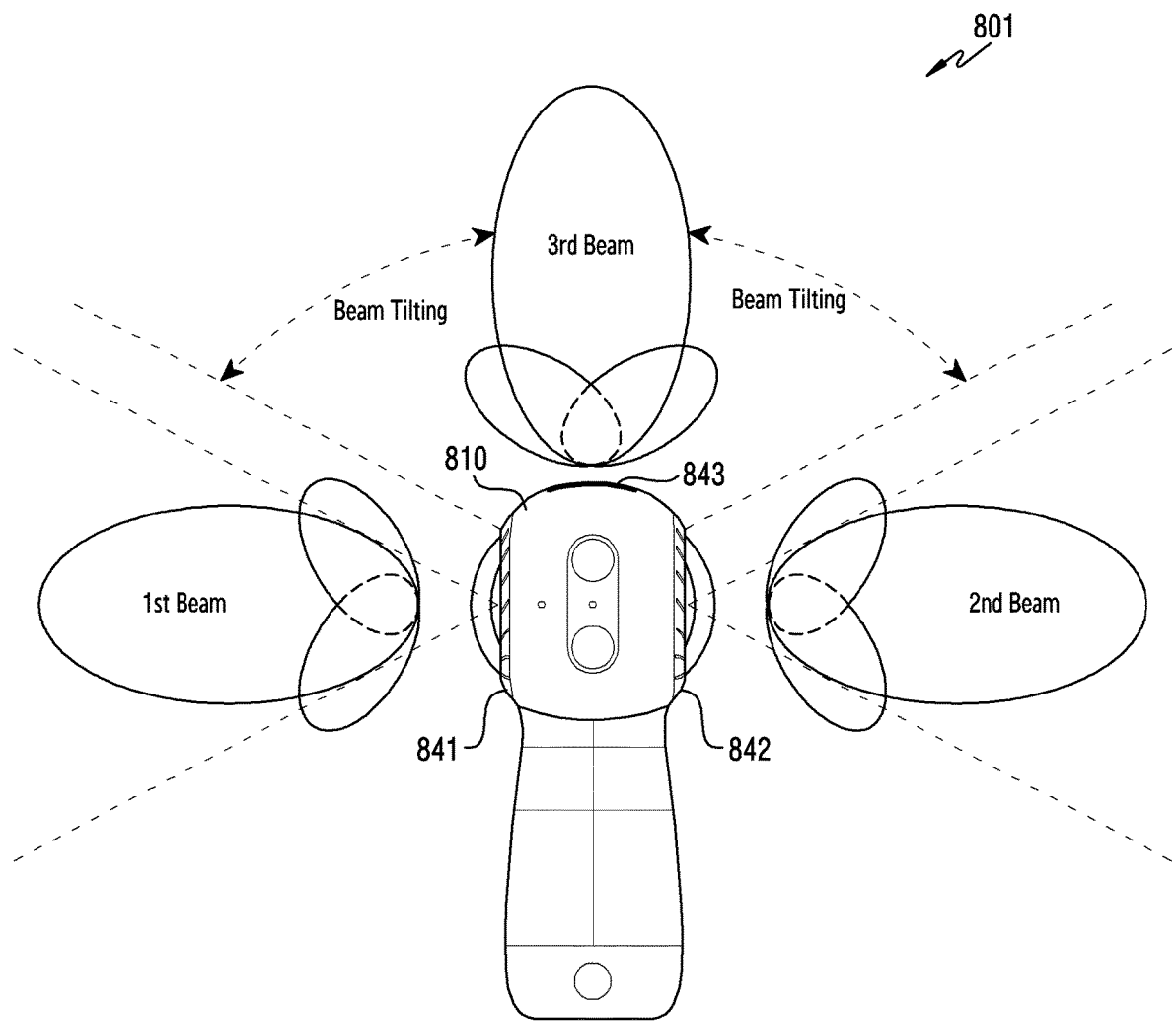
FIG. 8A is a diagram illustrating an example radiation pattern of the electronic device according to an embodiment.
Figure 8B:
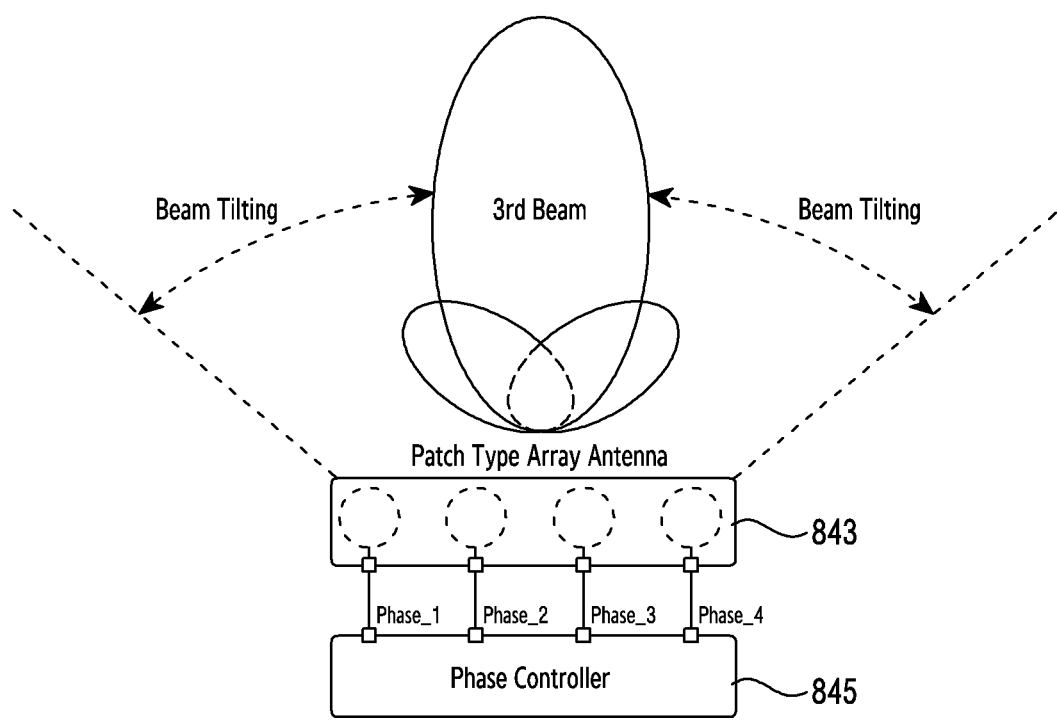
FIG. 8B is a diagram illustrating an example patch antenna according to an embodiment.

FIG. 8A is a diagram illustrating an example radiation pattern of the electronic device according to an embodiment and FIG. 8B is a diagram illustrating an example patch antenna according to an embodiment.

Referring to FIGS. 8A and 8B, an electronic device 801 according to an embodiment may include a first antenna 841 that transmits and receives signals in a first direction, a second antenna 842 that transmits and receives signals in a second direction, and a third antenna 843 that transmits and receives signals in a third direction.

The first antenna 841 and the second antenna 842 may be respectively similar to the first antenna structure 241 and the second antenna structure 242 described above.

The direction in which the third antenna 843 transmits and receives radio signals may be perpendicular to the first direction and the second direction. The third antenna 843 may be positioned at the center of the top of a housing 810. The third antenna 843 may be positioned in the housing 810 to not be exposed to a user. The third antenna 843 may be a directional antenna. The third antenna 843 can support beam tilting to be able to cover directions that the first antenna 841 and the second antenna 842 cannot cover. For example, the third antenna 843, as shown in FIG. 8B, may be an array antenna formed by combining several patch type antennas and the phases of the frequencies that are input to respective array antennas by a phase controller 845 are controlled, thereby being able to beam tilting.

FIG. 8B shows that the third antenna 843 includes four patch antennas, but it is only an example and does not limit the disclosure. For example, the third antenna 843 may be an array antenna formed by combining three or fewer antennas or five or more antennas.

The electronic device 801 according to an embodiment can support directions, which the first antenna 841 and the second antenna 842 cannot support, using a single antenna (e.g., the third antenna 843), so it is possible to transmit and receive radio signals in substantially all directions.

Figure 9A:
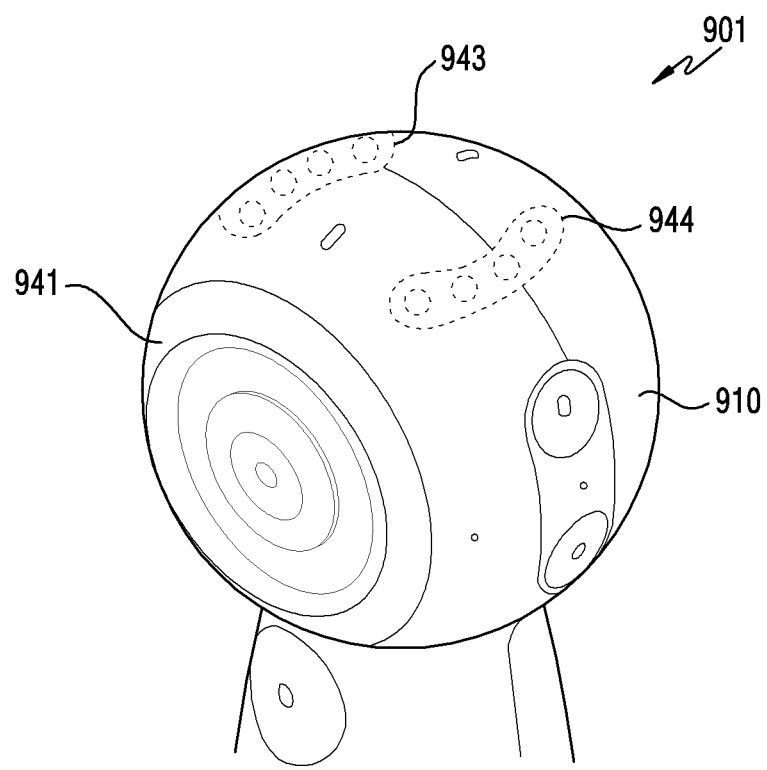
FIG. 9A is a diagram illustrating an example external appearance of an electronic device according to an embodiment.
Figure 9B:
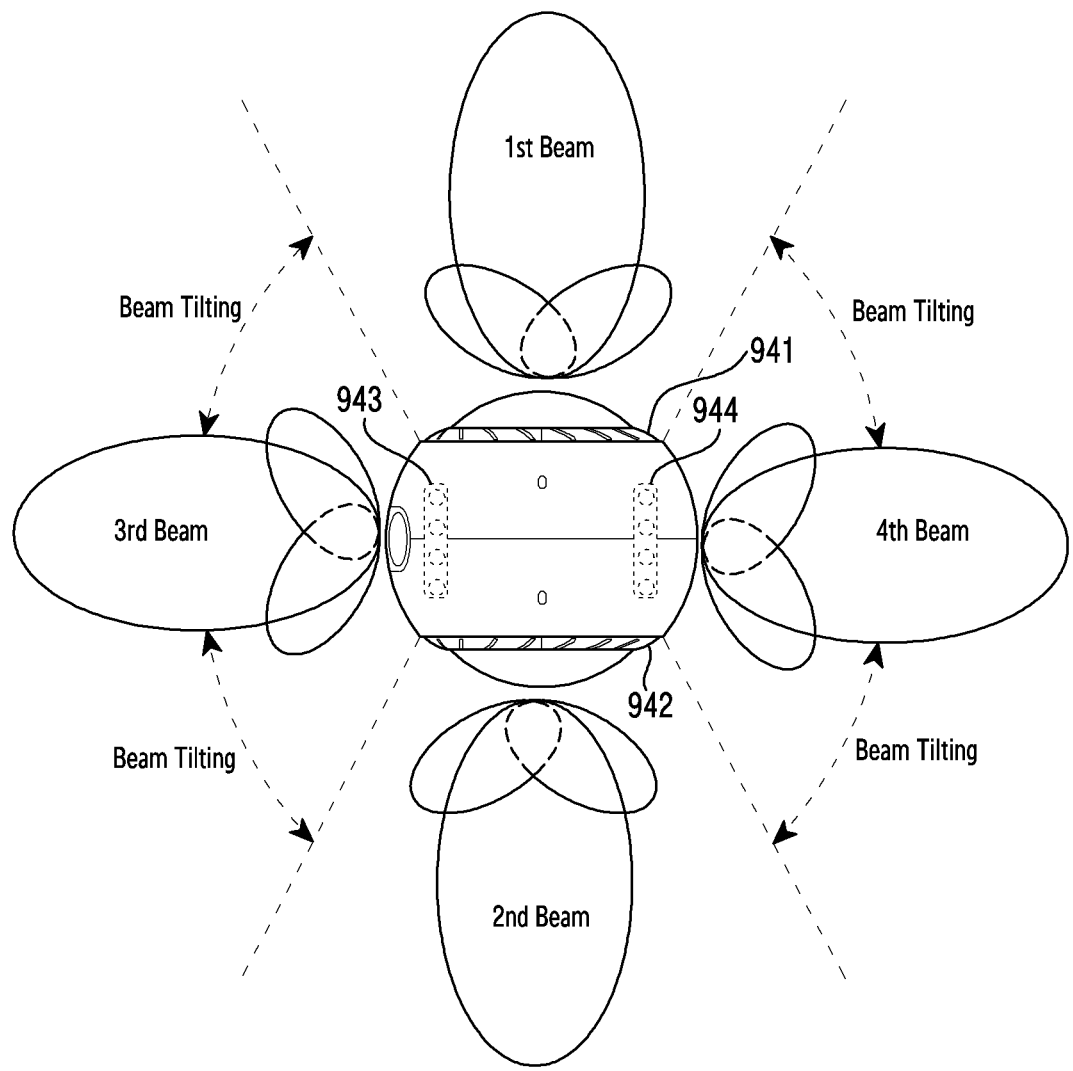
FIG. 9B is a diagram illustrating an example radiation pattern of an electronic device according to an embodiment.

FIG. 9A is a diagram illustrating an example external appearance of an electronic device according to an embodiment and FIG. 9B is a diagram illustrating an example radiation pattern of an electronic device according to an embodiment.

Referring to FIGS. 9A and 9B, an electronic device 901 according to an embodiment may include a first antenna 941 that transmits and receives signals in a first direction, a second antenna 942 that transmits and receives signals in a second direction, a third antenna 943 that transmits and receives signals in a third direction, and a fourth antenna 944 that transmits and receives signals in a fourth direction.

The first antenna 941 and the second antenna 942 may be respectively similar to the first antenna structure 241 and the second antenna structure 242 described above. The third antenna 943 and the fourth antenna 944 may also be respectively similar to the third antenna 843 of FIGS. 8A and 8B. Accordingly, a detailed description thereof may not be repeated here.

The third antenna 943 and the fourth antenna 944 may be disposed symmetrically on sides of the top of the housing 910.

The electronic device 901 according to an embodiment can support directions, which the first antenna 941 and the second antenna 942 cannot support, using several antennas (e.g., the third antenna 943 and the fourth antenna 944), so it is possible to transmit and receive radio signals in substantially all directions.

Figure 10:
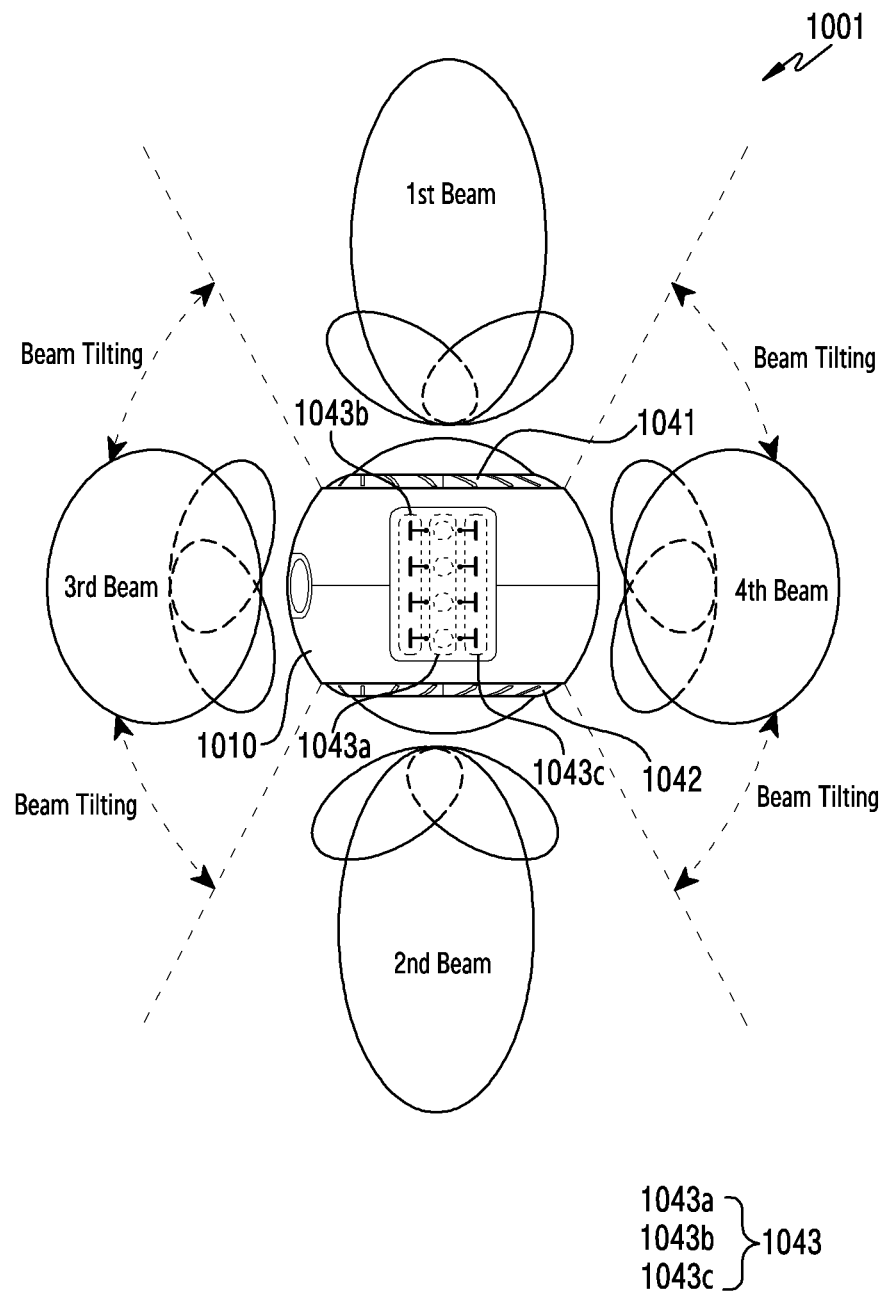
FIG. 10 is a diagram illustrating an example radiation pattern of an electronic device according to an embodiment.

FIG. 10 is a diagram illustrating an example radiation pattern of an electronic device according to an embodiment.

Referring to FIG. 10, an electronic device 1001 according to an embodiment may include a first antenna 1041 that transmits and receives signals in a first direction, a second antenna 1042 that transmits and receives signals in a second direction, and a third antenna 1043 that transmits and receives signals in a third direction and/or a fourth direction.

The first antenna 1041 and the second antenna 1042 may be respectively similar to the first antenna structure 241 and the second antenna structure 242 described above. Accordingly, a detailed description thereof may not be repeated here.

The third antenna 1043 may be positioned at the center of the top of a housing 1010. The antenna 1043 may be a complex antenna formed by combining various types of antennas. For example, the antenna 1043, as shown in FIG. 10, may be a complex antenna in which several dipole antennas 1043b and 1043c are positioned left and right around several patch antennas 1043a. The patch antennas 1043a and the dipole antennas 1043b positioned left can transmit and receive signals in the third direction, and the patch antennas 1043a and the dipole antennas 1043c positioned right can transmit and receive signal in the fourth direction.

The third antenna 1043 can support beam tilting in the third direction and the fourth direction. For example, the third antenna 1043 can support beam tilting in the third direction and the fourth direction by controlling the phase of a frequency.

The electronic device 1001 according to an embodiment can receive radio signals in substantially all directions using the first antenna 1041, the second antenna 1042, and the third antenna 1043.

Annular (circular) antenna structures were described by way of non-limiting example above. They are only examples and do not limit embodiments. For example, and without limitation, an antenna structure may be formed in a polygonal (e.g., a dodecagonal or more) shape close to a circle.

The electronic devices according to various example embodiments described above can use a metal decoration (e.g., metal rings) forming a portion of the housing or disposed in the housing as antennas. The electronic devices have slots on a surface of the metal decorations or rings having a waveguide structure, thereby being able to support millimeter wave communication. It is possible to support millimeter wave communication in several directions using several metal decorations or rings disposed in different directions as antennas. The electronic devices have at least one separate antenna (e.g., a patch antenna and/or an array antenna) that transmit and receive radio signals in directions, which the antennas using the metal decorations or rings cannot cover, thereby being able to support millimeter wave communication in substantially all directions.

An electronic device including the antennas structures according to various embodiments described above can perform wireless communication (e.g., millimeter wave communication) with an external device using the antenna structures. The electronic device can take images (e.g., 3D moving images of UHD). The electronic device can transmit the taken images to external devices in real or substantially real time using the antenna structures. According to an embodiment, the electronic device can control the phase of at least one antenna that can perform beam tilting (e.g., the third antenna 843 of FIGS. 8A and 8B, the third antenna 943 and the fourth antenna 944 of FIGS. 9A and 9B, and the third antenna 1043 of FIG. 10). For example, the electronic device can make the beam of at least one antenna to be directed to the external device by controlling the phase of the at least one antenna.

According to various example embodiments of the present disclosure, an electronic device (e.g., the electronic device (101), the electronic device (201), the electronic device (801), the electronic device (901), the electronic device (1001)) may comprise: a housing (e.g., the housing (210), the housing (810), the housing (910), the housing (1010)); an antenna structure (e.g., the antenna module (240)) comprising a portion of the housing or disposed in the housing, and including an annular conductive structure, the annular conductive structure having a first surface (e.g., the first surface (41)) facing an outside of the housing, a second surface (e.g., the second surface (42)) facing a direction opposite the first surface, an internal space (e.g., the internal space (43)) defined by the first surface and the second surface, and a plurality of slots (e.g., the several slots (44)) having a repeating pattern and formed through the first surface to the internal space; a conductive member (e.g., the feed member (51)) disposed in the internal space; a wireless communication circuit (e.g., the wireless communication circuit (792)) electrically connected with the conductive member and configured to form a directional beam using the antenna structure; and a ground (e.g., the ground region (73), the ground region (74)) electrically connected to the annular conductive structure.

According to various example embodiments, the wireless communication circuit may transmit and/or receive signals having a frequency between 3 GHz and 100 GHz.

According to various example embodiments, the several slots may be formed symmetrically around a center of the annular conductive structure.

According to various example embodiments, the annular conductive structure may have a circular shape.

According to various example embodiments, the plurality of slots may be disposed at regular angles such that the antenna structure provides a directional beam in a predetermined radiation direction.

According to various example embodiments, the angle may be a value between 0 degrees and 90 degrees.

According to various example embodiments, the electronic device may further comprise at least one image sensor (e.g., the first camera (220), the second camera (230)) facing an opening defined by the annular conductive structure.

According to various example embodiments, the at least one image sensor may include: a first image sensor (e.g., the first camera (220)) configured to photograph in a first direction; and a second image sensor (e.g., the second camera (230)) configured to photograph in a second direction opposite to the first direction.

According to various example embodiments, the antenna structure may include: a first antenna (e.g., the first antenna structures (241), the first antenna (841), the first antenna (941), the first antenna (1041)) configured to provide a directional beam in the first direction; and a second antenna (e.g., the second antenna structures (242), the second antenna (842), the second antenna (942), the second antenna (1042)) configured to provide a directional beam in the second direction.

According to various example embodiments, the electronic device may further comprise a third antenna structure (e.g., the third antenna (843), the third antenna (943), the fourth antenna (944), the third antenna (1043)) comprising at least one antenna configured to provide a directional beam in a third direction perpendicular to the first direction and the second direction.

According to various example embodiments, the third antenna structure may support beam tilting in accordance with a phase change.

According to various embodiments, the wireless communication circuit may be configured to transmit images taken through the at least one image sensor to another device in substantially real time using at least one of the first antenna structure, the second antenna structure, and the third antenna structure.

According to various example embodiments, the electronic device may further comprise an omni-directional antenna, and the antenna structure may support near field communication by coupling to the omni-directional antenna when the omni-directional antenna is operated.

According to various example embodiments, a gain, a width, or a direction of the directional beam may be determined by at least one of the number of the plurality of slots or the angles of the plurality of slots.

According to various example embodiments, the conductive member may emit, to the internal space, signals fed through a signal line (e.g., the signal line (71)) of a coaxial cable (e.g., the coaxial cable (70)) from the wireless communication circuit.

According to various example embodiments of the present disclosure, an electronic device (e.g., the electronic device (101), the electronic device (201), the electronic device (801), the electronic device (901), the electronic device (1001)) may comprise: a housing (e.g., the housing (210), the housing (810), the housing (910), the housing (1010)); a first camera (e.g., the first camera (220)) positioned in a first opening of the housing and configured to photograph in a first direction; a second camera (e.g., the second camera (230)) positioned in a second opening of the housing and configured to photograph in a second direction opposite the first direction; a first antenna (e.g., the first antenna structures (241), the first antenna (841), the first antenna (941), the first antenna (1041)) including a first conductive structure comprising a conductive material surrounding the first camera, and configured to have a directional beam in the first direction; a second antenna (e.g., the second antenna structures (242), the second antenna (842), the second antenna (942), the second antenna (1042)) including a second conductive structure comprising a conductive material surrounding the second camera, and configured to have a directional beam in the second direction; and at least one third antenna (e.g., the third antenna (843), the third antenna (943), the fourth antenna (944), the third antenna (1043)) configured to have a directional beam in a third direction perpendicular to the first direction and the second direction, wherein the first conductive structure and the second conductive structure include: a first surface (e.g., the first surface (41)) facing the outside of the housing; a second surface (e.g., the second surface (42)) facing a direction opposite the first surface; an internal space (e.g., the internal space (43)) defined by the first surface and the second surface; and a plurality of slots (e.g., the several slots (44)) having a repeating pattern disposed on the first surface.

According to various example embodiments, the first conductive structure and the second conductive structure may further include: a conductive member (e.g., the feed member (51)) comprising a conductive material disposed in the internal space; and an offset member (e.g., the offset member (52)) disposed to face the conductive member.

According to various example embodiments, the plurality of slots may be symmetrically disposed, and at least one of gains, widths, or directions of the first conductive structure and the second conductive structure may be changed by at least one of the number of the plurality of slots and angles of the plurality of slots.

According to various example embodiments, the third antenna may support beam tilting in accordance with a phase change.

According to various example embodiments, the electronic device may further comprise a wireless communication circuit (e.g., the wireless communication circuit (792)) configured to transmit images taken through the first camera and the second camera to another device in substantially real time using at least one of the first antenna, the second antenna, or the at least one third antenna.

According to various example embodiments, an electronic device can transmit high-quality images to another device in real or substantially real time through an antenna that supports high-speed communication. According to various example embodiments, an electronic device implements a high-speed communication antenna using a conductive decoration forming a portion of a housing or positioned in the housing, whereby there is no need for a specific space for disposing an antenna. According to various example embodiments, an electronic device can transmit and receive radio signals in substantially all directions through several directional antennas.

The electronic device according to various example embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the spirit and scope of the disclosure, as set forth, for example, in the appended claims. Therefore, the scope of the disclosure is defined not or limited by the detailed description.

What is claimed is:
1. An electronic device comprising:
a housing;
an antenna structure comprising a portion of the housing or disposed in the housing, and including an annular conductive structure, the annular conductive structure comprising a first surface facing an outside of the housing, a second surface facing a direction opposite the first surface, an internal space defined by the first surface and the second surface, and a plurality of slots having a repeating pattern and formed through the first surface to the internal space;
a conductive member disposed in the internal space;
at least one image sensor facing an opening defined by the annular conductive structure;

a wireless communication circuit electrically connected with the conductive member and configured to provide a directional beam using the antenna structure; and
a ground electrically connected to the annular conductive structure.

2. The electronic device of claim 1, wherein the wireless communication circuit is configured to transmit and/or receive signals having a frequency in a range of 3 GHz to 100 GHz.

3. The electronic device of claim 1, wherein the plurality of slots are disposed symmetrically around a center of the annular conductive structure.

4. The electronic device of claim 1, wherein the annular conductive structure has a circular shape.

5. The electronic device of claim 4, wherein the plurality of slots have regular angles so that the antenna structure provides a directional beam in a predetermined radiation direction.

6. The electronic device of claim 5, wherein the angle is a value in a range of 0 degrees to 90 degrees.

7. The electronic device of claim 1, wherein the at least one image sensor includes:
a first image sensor configured to photograph in a first direction; and
a second image sensor configured to photograph in a second direction opposite the first direction.

8. The electronic device of claim 7, wherein the antenna structure includes:
a first antenna structure including at least one antenna configured to provide a directional beam in the first direction; and
a second antenna structure including at least one antenna configured to provide a directional beam in the second direction.

9. The electronic device of claim 8, further comprising a third antenna structure including at least one antenna configured to provide a directional beam in a third direction perpendicular to the first direction and the second direction.

10. The electronic device of claim 9, wherein the third antenna structure is configured to support beam tilting in accordance with a phase change.

11. The electronic device of claim 9, wherein the wireless communication circuit is configured to transmit images taken through the at least one image sensor to another device in substantially real time using at least one of the first antenna structure, the second antenna structure, and the third antenna structure.

12. The electronic device of claim 11, further comprising an omni-directional antenna,
wherein the antenna structure is configured to support near field communication by coupling to the omni-directional antenna based on the omni-directional antenna being operated.

13. The electronic device of claim 8, wherein a gain, a width, or a direction of the directional beam is determined by at least one of the number of the plurality of slots or the angles of the plurality of slots.

14. The electronic device of claim 1, wherein the conductive member is configured to emit, to the internal space, signals fed through a signal line of a coaxial cable from the wireless communication circuit.

15. An electronic device comprising:
a housing;
a first camera disposed in a first opening of the housing and configured to photograph in a first direction;
a second camera disposed in a second opening of the housing and configured to photograph in a second direction opposite the first direction;
a first antenna comprising a first annular conductive structure surrounding the first camera, and configured to provide a directional beam in the first direction;
a second antenna comprising a second annular conductive structure surrounding the second camera, and configured to provide a directional beam in the second direction; and
at least one third antenna configured to provide a directional beam in a third direction perpendicular to the first direction and the second direction,
wherein the first annular conductive structure and the second annular conductive structure include:
a first surface facing the outside of the housing;
a second surface facing a direction opposite the first surface;
an internal space defined by the first surface and the second surface; and
a plurality of slots having a repeating pattern and formed through the first surface to the internal space;
a first conductive member disposed in the internal space of the first conductive structure;
a second conductive member disposed in the internal space of the second conductive structure;
a wireless communication circuit electrically connected with the first conductive member and configured to provide the directional beam in the first direction using the first antenna, and electrically connected with the second conductive member and configured to provide the directional beam in the second direction using the second antenna; and
a ground electrically connected to the first annular conductive structure and the second annular conductive structure,
wherein the first camera faces an opening defined by the first annular conductive structure and the second camera faces an opening defined by the second annular conductive structure.

16. The electronic device of claim 15, wherein the first annular conductive structure and the second annular conductive structure further include:
an offset member disposed to face the respective first or second conductive member.

17. The electronic device of claim 15, wherein the plurality of slots are symmetrically positioned, and
at least one of gains, widths, or directions of the first annular conductive structure and the annular second conductive structure is configured to be determined by at least one of the number of the plurality of slots and angles of the several slots.

18. The electronic device of claim 15, wherein the third antenna is configured to support beam tilting in accordance with a phase change.

19. The electronic device of claim 15, wherein the wireless communication circuit is configured to transmit images taken through the first camera and the second camera to another device in substantially real time using at least one of the first antenna, the second antenna, or the at least one third antenna.

* * * * *